(12) United States Patent
Fang et al.

(10) Patent No.: US 9,420,274 B2
(45) Date of Patent: Aug. 16, 2016

(54) STEREOSCOPIC IMAGE SYSTEM AND RELATED DRIVING METHOD FOR BALANCING BRIGHTNESS OF LEFT-EYE AND RIGHT-EYE IMAGES

(71) Applicant: WINTEK CORPORATION, Taichung (TW)

(72) Inventors: Chong-Yang Fang, Taichung (TW); Tsung-Yen Hsieh, Taichung (TW)

(73) Assignee: WINTEK CORPORATION, Taichung (TW)

( * ) Notice: Subject to any disclaimer, the term of this patent is extended or adjusted under 35 U.S.C. 154(b) by 409 days.

(21) Appl. No.: 14/109,878

(22) Filed: Dec. 17, 2013

(65) Prior Publication Data
US 2014/0168393 A1  Jun. 19, 2014

(30) Foreign Application Priority Data
Dec. 18, 2012 (TW) .............. 101148151 A

(51) Int. Cl.
*H04N 13/00* (2006.01)
*H04N 13/04* (2006.01)
*G06F 3/038* (2013.01)

(52) U.S. Cl.
CPC ....... *H04N 13/0497* (2013.01); *H04N 13/0025* (2013.01); *H04N 13/0438* (2013.01); *H04N 2213/008* (2013.01)

(58) Field of Classification Search
CPC .......... H04N 13/0434; H04N 13/0459; H04N 13/0059; H04N 13/0422; G02B 27/26; G09G 3/3648; G09G 3/3614; G09G 3/3688; G09G 3/3611; G09G 3/3655
See application file for complete search history.

(56) References Cited

U.S. PATENT DOCUMENTS

| | | | | |
|---|---|---|---|---|
| 4,734,756 A | * | 3/1988 | Butterfield | H04N 19/597 348/43 |
| 2004/0169619 A1 | * | 9/2004 | Hata | H04N 13/0495 345/1.1 |
| 2011/0273439 A1 | * | 11/2011 | Son | H04N 13/0438 345/419 |
| 2011/0285712 A1 | * | 11/2011 | Arai | G09G 3/003 345/426 |
| 2012/0212577 A1 | * | 8/2012 | Kim | H04N 13/0497 348/43 |
| 2013/0002837 A1 | * | 1/2013 | Yuno | H04N 13/0438 348/56 |
| 2013/0051659 A1 | * | 2/2013 | Yamamoto | H04N 13/026 382/154 |
| 2014/0168393 A1 | * | 6/2014 | Fang | H04N 13/0025 348/58 |
| 2015/0109537 A1 | * | 4/2015 | Kompanets | G02F 1/141 348/791 |

* cited by examiner

*Primary Examiner* — Sath V Perungavoor
*Assistant Examiner* — Howard D Brown, Jr.
(74) *Attorney, Agent, or Firm* — Ming Chow; Sinorica, LLC

(57) ABSTRACT

A stereoscopic image system includes an image-generating unit and a modulating module. According to an image signal controller, the image-generating unit is configured to provide a first image having a first brightness during a first period and a second image having a second brightness during a second period. The modulating module is configured modulate the image signal controller during the first and second periods so that the first image has a third brightness after passing through a first lens of polarized glasses and the second image has a fourth brightness after passing through a second lens of polarized glasses, wherein the difference between the third brightness and the fourth brightness is smaller than the difference between the first and second brightness.

11 Claims, 6 Drawing Sheets

STEREOSCOPIC IMAGE SYSTEM AND RELATED DRIVING METHOD FOR BALANCING BRIGHTNESS OF LEFT-EYE AND RIGHT-EYE IMAGES

BACKGROUND OF THE INVENTION

1. Field of the Invention

The present invention is related to a stereoscopic image system and related driving method, and more particularly, to a stereoscopic image system and related driving method for balancing brightness of left-eye and right-eye images.

2. Description of the Prior Art

Three-dimensional (3D) display technology provides more vivid visual experiences than traditional two-dimensional (2D) display technology. In general, the stereoscopic image processing involves two camera systems in which two different images or videos are taken from slightly different camera angles and locations. The object is to simulate the manner in which depth is perceived by a pair of human eyes, which are themselves slightly offset from each other and thus view images at slightly different angles. The two camera images or videos are superimposed as an integrated stereoscopic image and presented to the viewer simultaneously on a television or movie screen. The two camera images are then separated in some fashion for the viewer so that one eye sees only one image and the other eye sees only the other image. In this way, an illusion of depth is created by simulating normal vision. The visual cortex of the human brain fuses this into perception of a 3D scene or composition.

There are two major types of 3D viewing environments: naked-eye and glasses-type. In naked-eye 3D viewing environment, stereoscopic images are directly generated using e-holographic, volumetric, multi-planar or multiplexed 2D display devices and can be viewed without additional devices. In glasses-type viewing environment, 3D viewing devices, such as polarizing glasses, anaglyph glasses, or shutter glasses, are required to creating the illusion of stereoscopic images from planer images.

In a polarized 3D image system, a polarization converting unit or device needs to be disposed in front of a display device or a projector for providing left-eye images polarized in one direction (such as horizontally-polarized) and right-eye images polarized in another direction (such as vertically-polarized). The viewer wears polarizing glasses which also contain a pair of polarizing lenses oriented in the same manner, such as a horizontally-polarized left-eye lens and a vertically-polarized right-eye lens. Since each lens only passes light which is similarly polarized, each eye only sees one of the projected images, thereby achieving 3D effect by creating the illusion of stereoscopic images from planer images.

The polarization converting unit may be a twisted nematic liquid crystal display (TN-LCD) panel or an electrical control birefringence liquid crystal display (ECB-LCD) panel. In a TN-LCD panel or an ECB-LCD panel, the angle or birefringence of liquid crystal molecules is controlled by applying an external field. The light which passed the LCD panel during different display periods may thus be differently polarized. According to the disposition of the polarized units, the TN/ECB-LCD panel has two operational modes: normally-white (NW) mode and normally-black (NB) mode.

FIG. 1 is a diagram illustrating the optical-electrical characteristic of a TN-LCD panel. The horizontal axis represents the voltages applied to the LCD panel, and the vertical axis represents the transmittance of the LCD panel under specific applied voltage. NW represents the characteristic curve of the normally-white mode, and NB represents the characteristic curve of the normally-black mode. In the normally-white mode, the LCD panel with an applied voltage is in the "bright" state which passes light, and the LCD panel without an applied voltage is in the "dark" state which blocks light. In the normally-black mode, the LCD panel with an applied voltage is in the "dark" state which blocks light, and the LCD panel without an applied voltage is in the "bright" state which passes light. Regarding optical characteristics in the "dark" state, the LCD panel may provide a higher contrast due to self-compensation effect in the normally-white mode, while the contrast may be lowered due to leakage caused by light reaction in the normally-black mode. Regarding optical characteristics in the "bright" state, the LCD panel may provide a higher transmittance with a voltage is applied in the normally-black mode. Therefore, the user always perceives left-eye and right-eye images of different brightness, thereby influencing the 3D experience.

SUMMARY OF THE INVENTION

The present invention provides a stereoscopic image system for balancing brightness of left-eye and right-eye images. The stereoscopic image system includes an image-generating unit and a modulating module. The image-generating unit is configured to provide a first image having a first brightness according to an image signal controller during a first period; and provide a second image having a second brightness according to the image signal controller during a second period. The modulating module is configured to modulate the image signal controller during the first and second periods so that the first image has a third brightness after passing through a first lens of polarized glasses and the second image has a fourth brightness after passing through a second lens of the polarized glasses, wherein a difference between the third brightness and the fourth brightness is smaller than a difference between the first and second brightness.

The present invention also provides a method of balancing brightness of left-eye and right-eye images in a stereoscopic image system. The method includes providing a first image having a first brightness according to an image signal controller during a first period; providing a second image having a second brightness according to the image signal controller during a second period; receiving the first image during the first period using a first lens of polarized glasses, wherein the first image has a third brightness after passing through the first lens; receiving the second image during the second period using a second lens of the polarized glasses, wherein the second image has a fourth brightness after passing through the second lens; and modulating the image signal controller during the first and second periods so that a difference between the third brightness and the fourth brightness is smaller than a difference between the first and second brightness.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
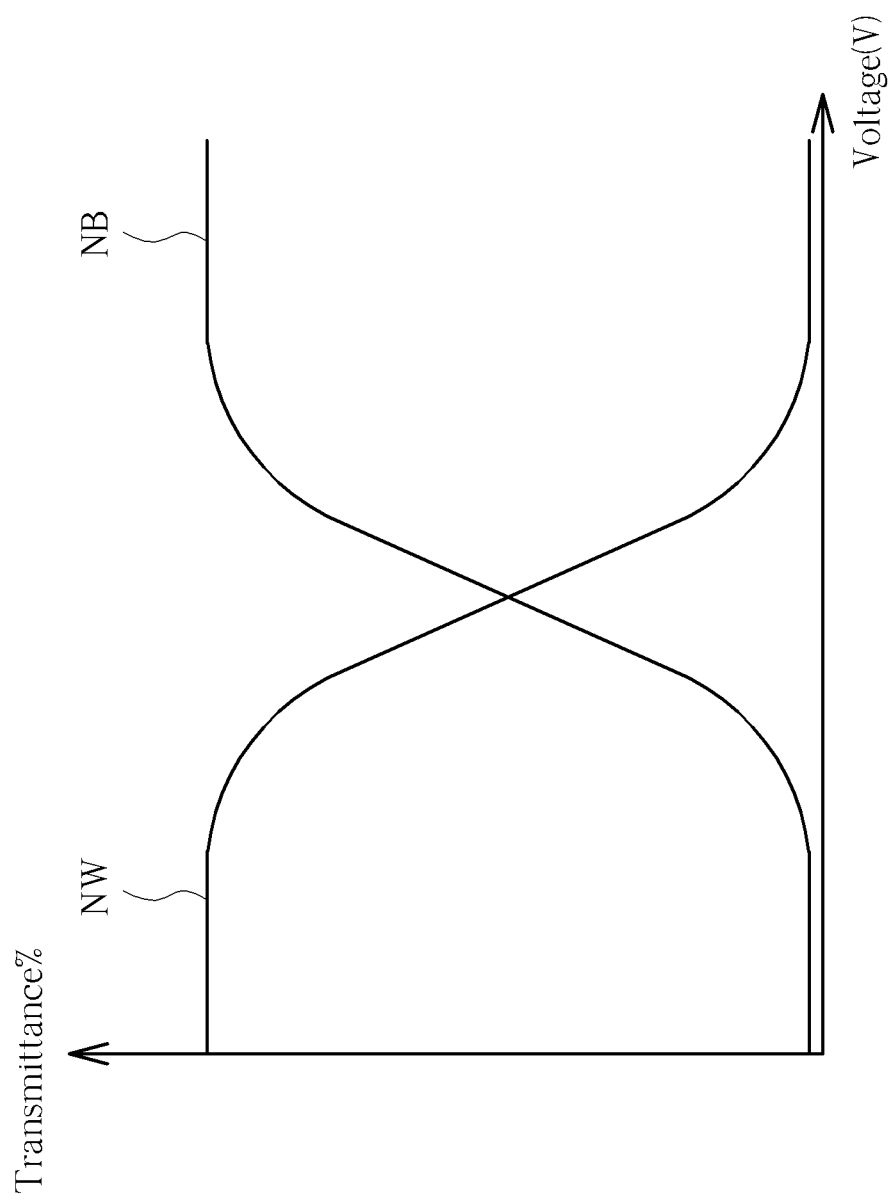
FIG. 1 is a diagram illustrating the optical-electrical characteristic of an LCD polarization converting unit.
Figure 2:
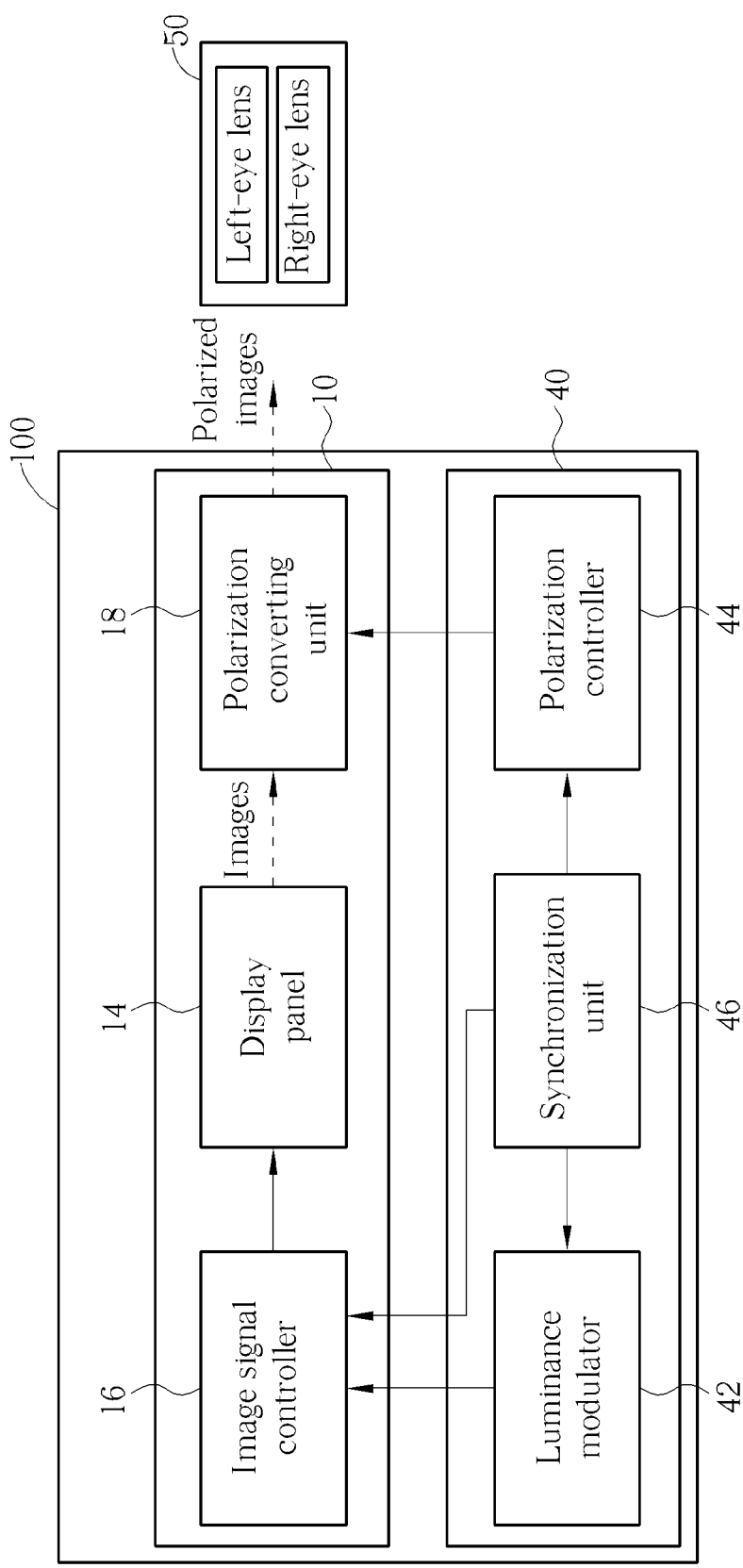
FIGS. 2-4 are functional diagrams illustrating stereoscopic image systems according to embodiments of the present invention.
Figure 3:
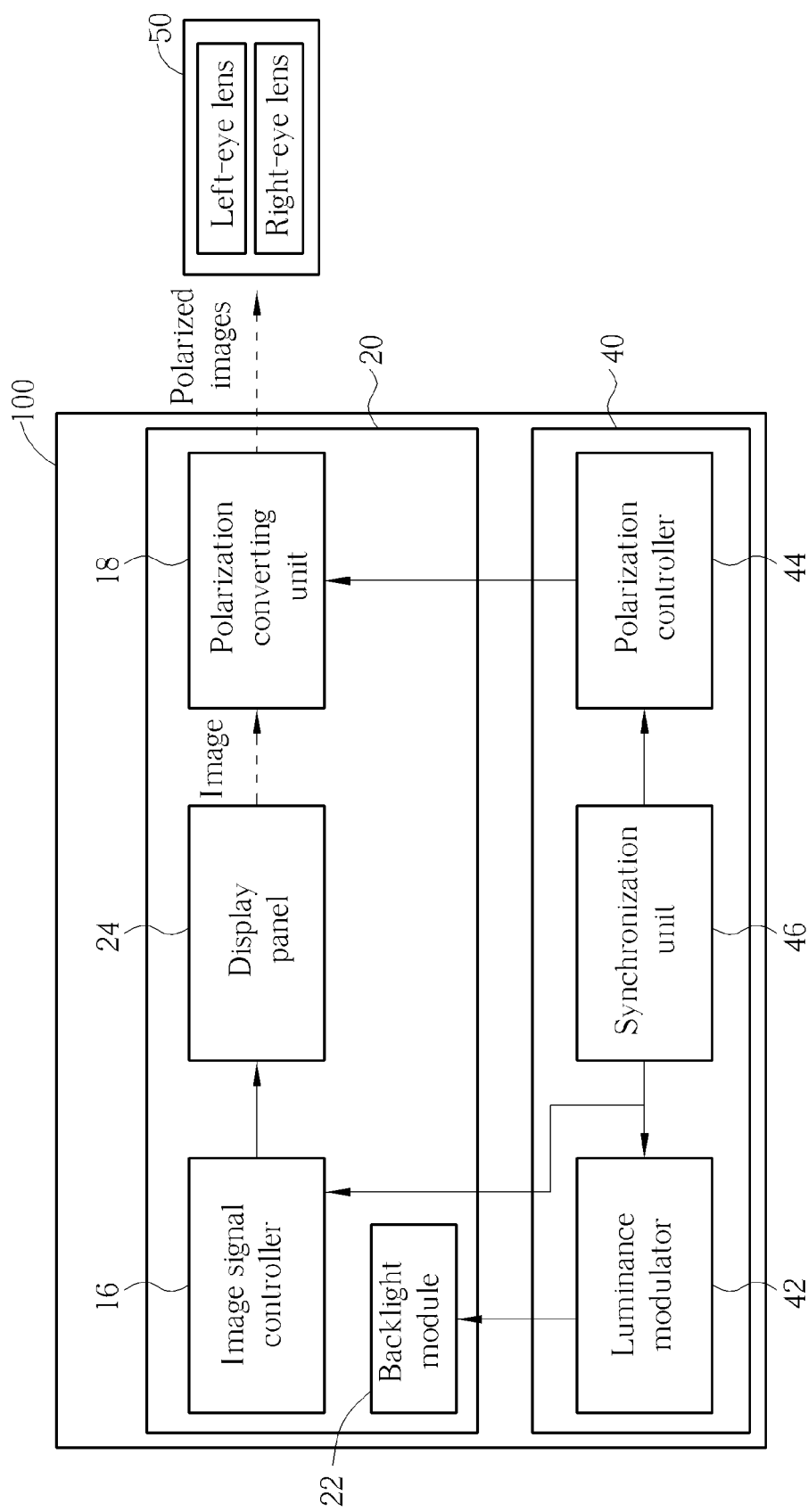
Figure 4:
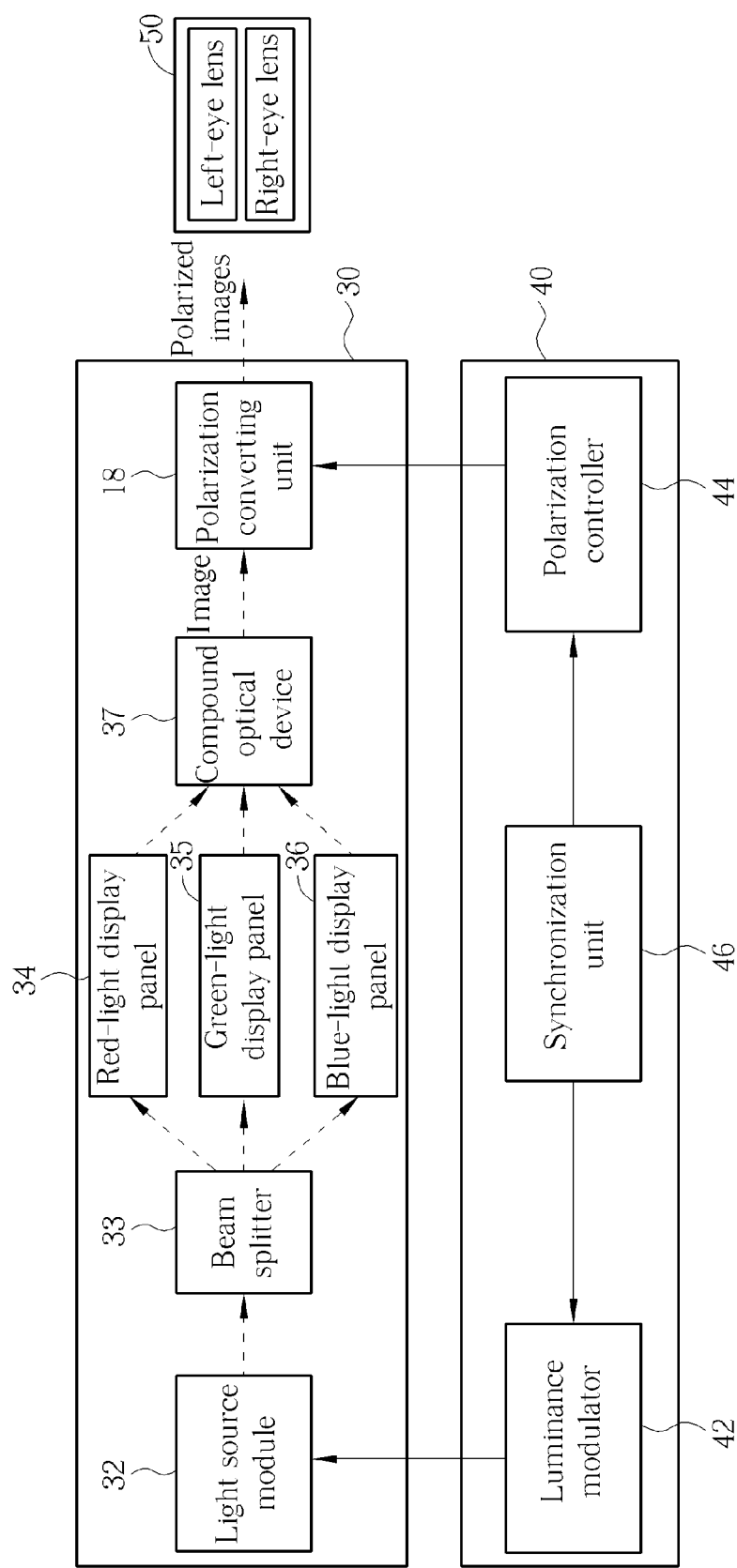
Figure 5:
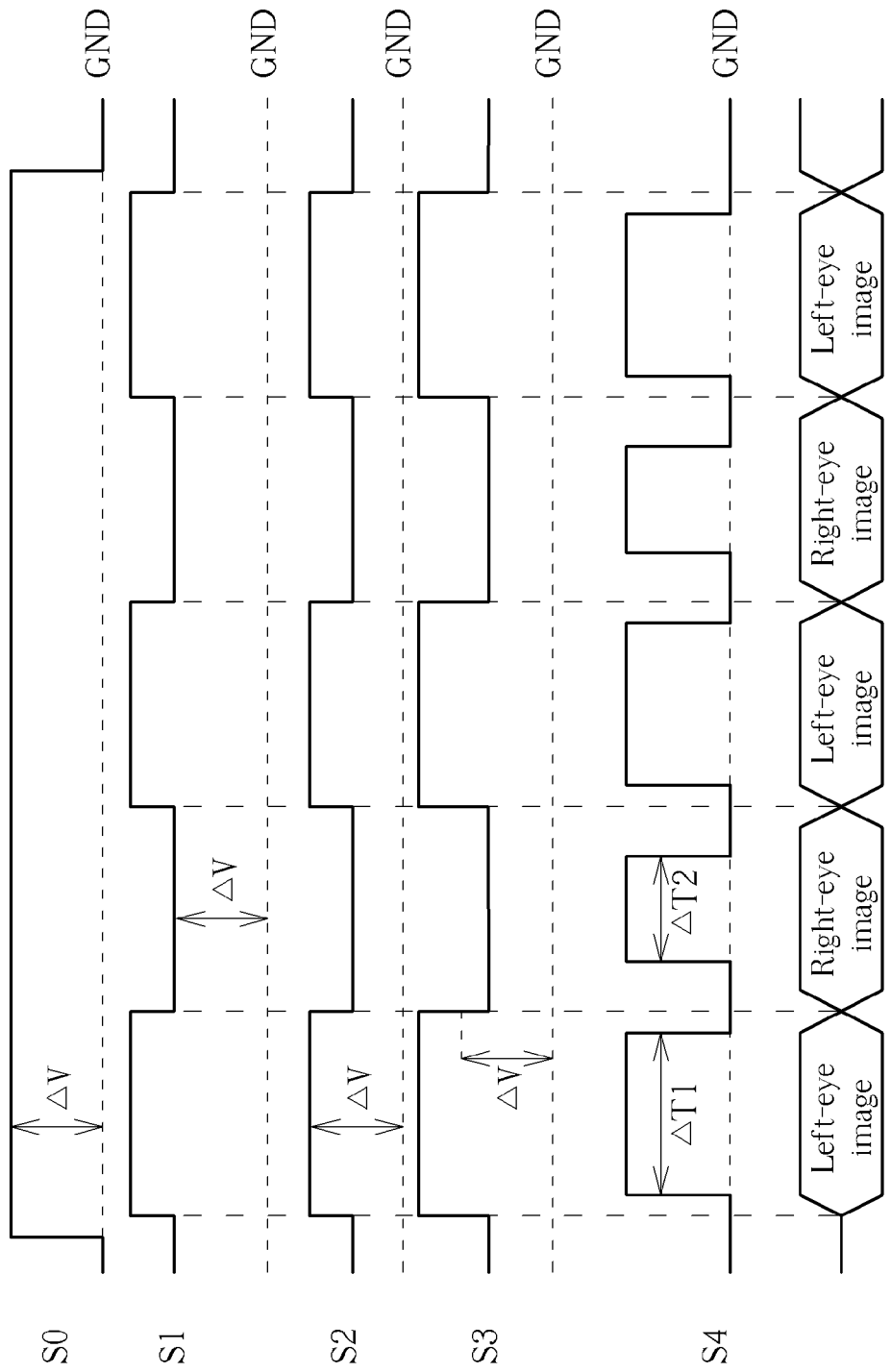
FIGS. 5-6 are diagrams illustrating the operations of the stereoscopic image systems according to embodiments of the present invention.
Figure 6:
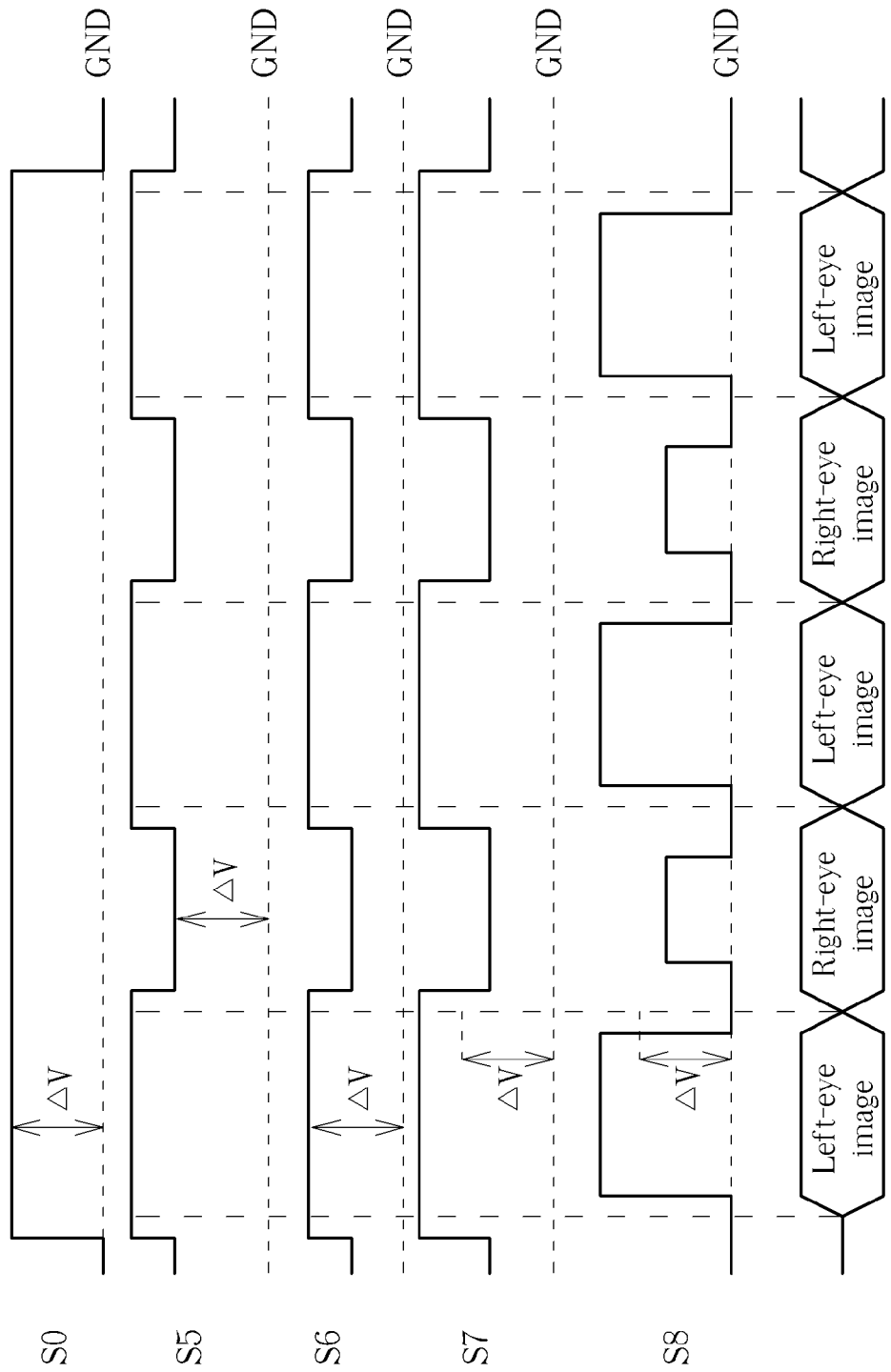

FIGS. 2-4 are functional diagrams illustrating stereoscopic image systems 100, 200 and 300 according to embodiments of the present invention. FIGS. 5-7 are diagrams illustrating the operations of the stereoscopic image systems 100, 200 and 300 according to embodiments of the present invention.

In the embodiment illustrated in FIG. 2, the stereoscopic image system 100 includes an image-generating unit 10 and a modulating module 40. The image-generating unit 10 includes a display panel 14, an image signal controller 16, and a polarization converting unit 18. The modulating module 40 includes a luminance modulator 42, a polarization controller 44, and a synchronization unit 46. In this embodiment, the stereoscopic image system 100 may be a display device, and the user may wear polarizing glasses 50 to view 3D images. The polarizing glasses 50 include a left-eye lens and a right-eye lens with different polarizations, thereby allowing one eye of the user to see only the light with a first polarization and allowing the other eye of the user to see only the light with a second polarization.

The display panel 14 may be a self-luminous display panel, such as an active-matrix organic light-emitting diode (AMOLED) display panel. Linearly or circularly polarized units may be disposed on the surface of the display panel 14 in order to provide images with certain polarizations. According to the signals received from the image signal controller 16, the display panel 14 may display left-eye images during left-eye periods and display right-eye images during right-eye periods, wherein the left-eye images and the right-eye images have identical contents but different depths.

The polarization converting unit 18 may be an active retarder and disposed on the emitting side of the display panel 14. The polarization controller 44 is configured to control the operational mode of the polarization converting unit 18 in order to change the polarization of the display images, thereby polarizing the left-eye images and the right-eye images differently.

The synchronization converting unit 18 is configured to synchronize the timings of the image signal controller 16, the luminance modulator 42 and the polarization controller 44. The user may then perceive the left-eye images and the right-eye images having the same brightness via respective left-eye and right-eye lenses, thereby creating the illusion of stereoscopic images in human brain.

In the embodiment illustrated in FIG. 3, the stereoscopic image system 200 includes an image-generating unit 20 and a modulating module 40. The image-generating unit 20 includes a backlight module 22, a display panel 24, an image signal controller 16, and a polarization converting unit 18. The modulating module 40 includes a luminance modulator 42, a polarization controller 44, and a synchronization unit 46. In this embodiment, the stereoscopic image system 200 may be a display device, and the user may wear polarizing glasses 50 to view 3D images. The display panel 24 may be a non-self-luminous display panel, such as a passive matrix LCD panel or an active matrix thin film transistor (TFT) LCD panel. The backlight module 22 may include LED, cold cathode fluorescent lamp (CCFL) or incandescent lamp, and may be disposed on the incident side of the display panel 14. Linearly or circularly polarized units may be disposed on the emitting side of the display panel 24 in order to provide images with certain polarizations. According to the signals received from the image signal controller 16, the display panel 24 may display left-eye images during left-eye periods and display right-eye images during right-eye periods, wherein the left-eye images and the right-eye images have identical contents but different depths. The polarization converting unit 18 may be an active retarder and disposed on the emitting side of the display panel 24. The polarization controller 44 is configured to control the operational mode of the polarization converting unit 18 in order to change the polarization of the display images, thereby polarizing the left-eye images and the right-eye images differently. The synchronization converting unit 46 is configured to synchronize the timings of the image signal controller 16, the luminance modulator 42 and the polarization controller 44. The user may then perceive the left-eye images and the right-eye images having the same brightness via respective left-eye and right-eye lenses, thereby creating the illusion of stereoscopic images in human brain.

In the embodiment illustrated in FIG. 4, the stereoscopic image system 300 includes an image-generating unit 30 and a modulating module 40. The image-generating unit 30 includes a light source module 32, a beam splitter 33, a red-light display panel 34, a green-light display panel 35, a blue-light display panel 36, a compound optical device 37, for example, a compound prism, and a polarization converting unit 18. The modulating module 40 includes a luminance modulator 42, a polarization controller 44, and a synchronization unit 46. In this embodiment, the stereoscopic image system 300 may be a projecting device capable of projecting 3D images onto a screen, and the user may wear polarizing glasses 50 to view 3D images. The light source module 32 may include LED, CCFL or incandescent lamp. The beam splitter 33 may project the light of the light source module 32 onto the red-light display panel 34, the green-light display panel 35, and the blue-light display panel 36 for providing red light, green light and blue light, which is then combined by the compound optical device 37 to form complete left-eye images and right-eye images, wherein the left-eye images and the right-eye images have identical contents but different depths. Linearly or circularly polarized units may be disposed on the emitting side of the compound optical device 37 in order to provide images with certain polarizations. The polarization converting unit 18 may be an active retarder and disposed on the emitting side of the compound optical device 37. The polarization controller 44 is configured to control the operational mode of the polarization converting unit 18 in order to change the polarization of the display images, thereby polarizing the left-eye images and the right-eye images differently. The synchronization converting unit 46 is configured to synchronize the timings of the image signal controller 16, the luminance modulator 42 and the polarization controller 44. The user may then perceive the left-eye images and the right-eye images having the same brightness via respective left-eye and right-eye lenses, thereby creating the illusion of stereoscopic images in human brain.

In the embodiments of the present invention, the polarization converting unit 18 may include a TN-LCD panel or an ECB-LCD panel. As previously explained, the polarization converting unit has different leakage and transmittance in the normally-white and normally black modes, thereby causing the left-eye and right-eye images to vary in brightness. Assuming that the polarization converting unit 18 is configured to operate in the normally-white mode during the left-eye periods and operate in the normally-black mode during the right-eye periods, the right-eye images are brighter than the left-eye images. In order to prevent such imbalanced luminance perception, the luminance modulator 42 of the present invention is configured to reduce the bright difference between images provided by the polarization converting unit 18 when operating in different modes.

FIGS. 5 and 6 are diagrams illustrating the operations of the stereoscopic image system 100, 200 and 300. S0 represents the original driving signals of the left/right-eye images. S1~S8 represent the modulated driving signals of the left/right-eye images. The driving signals S1~S8 may be the pixel driving signal of the display panel 14 (the embodiment of FIG. 2), the driving signal of the backlight module 22 (the embodiment of FIG. 3), or the driving signal of the light source module 32 (the embodiment of FIG. 4), and may be controlled by the luminance modulator 42.

The present invention may balance the brightness of the polarized left/right-eye images using voltage modulation technique, thereby reducing the bright difference caused by the polarization converting unit 18 when operating in different modes. Assuming that the polarization converting unit 18 is configured to operate in the normally-white mode during the left-eye periods and operate in the normally-black mode during the right-eye periods, the luminance modulator 42 may be configured to: (1) increase the amplitude of the driving signal (ΔV represents a reference amplitude) during the left-eye periods, as depicted by S1; (2) reduce the amplitude of the driving signal during the right-eye periods, as depicted by S2; or (3) simultaneously increase the amplitude of the driving signal during the left-eye periods and reduce the amplitude of the driving signal during the right-eye periods, as depicted by S3.

The present invention may also balance the brightness of the polarized left/right-eye images using pulse width modulation technique, thereby reducing the bright difference caused by the polarization converting unit 18 when operating in different modes. Assuming that the polarization converting unit 18 is configured to operate in the normally-white mode during the left-eye periods and operate in the normally-black mode during the right-eye periods, the luminance modulator 42 may be configured to: (1) modulate the original driving signal to the modulated driving signal having a larger duty cycle ΔT1 during the left-eye periods, and modulate the original driving signal to the modulated driving signal having a smaller duty cycle ΔT2 during the right-eye periods as depicted by S4.

The present invention may balance the brightness of the polarized left/right-eye images using voltage modulation and pulse width modulation techniques, thereby reducing the bright difference caused by the polarization converting unit 18 when operating in different modes. Assuming that the polarization converting unit 18 is configured to operate in the normally-white mode during the left-eye periods and operate in the normally-black mode during the right-eye periods, the luminance modulator 42 may be configured to: (1) modulate the original driving signal to the modulated driving signal having a larger amplitude and a larger duty cycle during the left-eye periods, as depicted by S5; (2) modulate the original driving signal to the modulated driving signal having a smaller amplitude and a smaller duty cycle during the right-eye periods, as depicted by S6; or (3) modulate the original driving signal to the modulated driving signal having a larger amplitude and a larger duty cycle during the left-eye periods, and modulate the original driving signal to the modulated driving signal having a smaller amplitude and a smaller duty cycle during the right-eye periods, as depicted by S7 and S8.

In conclusion, the present invention may adjust the brightness of the left/right-eye images before being polarized. The bright difference caused by the polarization converting unit 18 when operating in different modes may thus be lowered, thereby improving the 3D experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stereoscopic image system for balancing brightness of left-eye and right-eye images, comprising:
   an image-generating unit configured to:
      provide a first image having a first brightness according to an image signal controller during a first period; and
      provide a second image having a second brightness according to the image signal controller during a second period; and
   a modulating module configured to modulate the image signal controller during the first and second periods so that the first image has a third brightness after passing through a first lens of polarized glasses and the second image has a fourth brightness after passing through a second lens of the polarized glasses, wherein a difference between the third brightness and the fourth brightness is smaller than a difference between the first and second brightness.

2. The stereoscopic image system of claim 1, wherein the modulating module comprises a luminance modulator configured to modulate a driving signal for operating the image-generating unit, wherein the driving signal has different amplitudes or duty cycles during the first period and the second period.

3. The stereoscopic image system of claim 1, wherein the image-generating unit further comprises:
   a display panel having a plurality of pixels and configured to adjust a grayscale of each pixel according to the image signal controller for displaying the first image during the first period and adjust the grayscale of each pixel according to the image signal controller for displaying the second image during the second period;
   a polarized unit disposed on an emitting side of the display panel for polarizing the first image and the second image to a specific polarized status; and
   a polarization converting unit disposed on an emitting side of the polarized unit for polarizing the first image in the specific polarized status to the first image in a first polarized status and for polarizing the second image in the specific polarized status to the second image in a second polarized status.

4. The stereoscopic image system of claim 1, wherein the image-generating unit further comprises:
   a display panel for displaying the first image during the first period and displaying the second image during the second period;
   a backlight module configured to function as a light source of the display panel and adjust strength of the light source according to the image signal controller;
   a polarized unit disposed on an emitting side of the display panel for polarizing the first image and the second image to a specific polarized status; and
   a polarization converting unit disposed on an emitting side of the polarized unit for polarizing the first image in the specific polarized status to the first image in a first polarized status and for polarizing the second image in the specific polarized status to the second image in a second polarized status.

5. The stereoscopic image system of claim 1, wherein the image-generating unit further comprises:

a light source module configured to function as a light source and adjust strength of the light source according to the image signal controller;
a red-light display panel;
a green-light display panel;
a blue-light display panel;
a beam splitter configured to project the light source module onto the red-light display panel, the green-light display panel, and the blue-light display panel for providing red light, green light and blue light, respectively
a compound optical device arranged to receive the red-light, the green-light and the blue-light for providing the first image or the second image;
a polarized unit disposed on an emitting side of the compound optical device for polarizing the first image and the second image to a specific polarized status; and
a polarization converting unit disposed on an emitting side of the polarized unit for polarizing the first image in the specific polarized status to the first image in a first polarized status and for polarizing the second image in the specific polarized status to the second image in a second polarized status.

6. A method of balancing brightness of left-eye and right-eye images in a stereoscopic image system, comprising:
providing a first image having a first brightness according to an image signal controller during a first period;
providing a second image having a second brightness according to the image signal controller during a second period;
receiving the first image during the first period using a first lens of polarized glasses, wherein the first image has a third brightness after passing through the first lens;
receiving the second image during the second period using a second lens of the polarized glasses, wherein the second image has a fourth brightness after passing through the second lens; and
modulating the image signal controller during the first period and the second period so that a difference between the third brightness and the fourth brightness is smaller than a difference between the first and second brightness.

7. The method of claim 6, further comprising:
modulating a driving signal so that the driving signal has different amplitudes or duty cycles during the first period and the second period; and
modulating the image signal controller according to the driving signal.

8. The method of claim 7, further comprising:
providing a light source during the first period and the second period; and
adjusting strength of the light source according to the driving signal.

9. The method of claim 6, wherein the first image is in a first polarized status, the second image is in a second polarized status, and the first polarized status is different from the second polarized status.

10. The method of claim 9, wherein the first polarized status and the second polarized status are orthogonal.

11. The method of claim 9, further comprising:
blocking the second image using the first lens during the first period; and
blocking the first image using the second lens during the second period.

* * * * *